April 10, 1945.  J. F. O'BRIEN  2,373,331
ELECTRICITY CONDUCTOR UNIT
Filed July 25, 1941   2 Sheets-Sheet 1
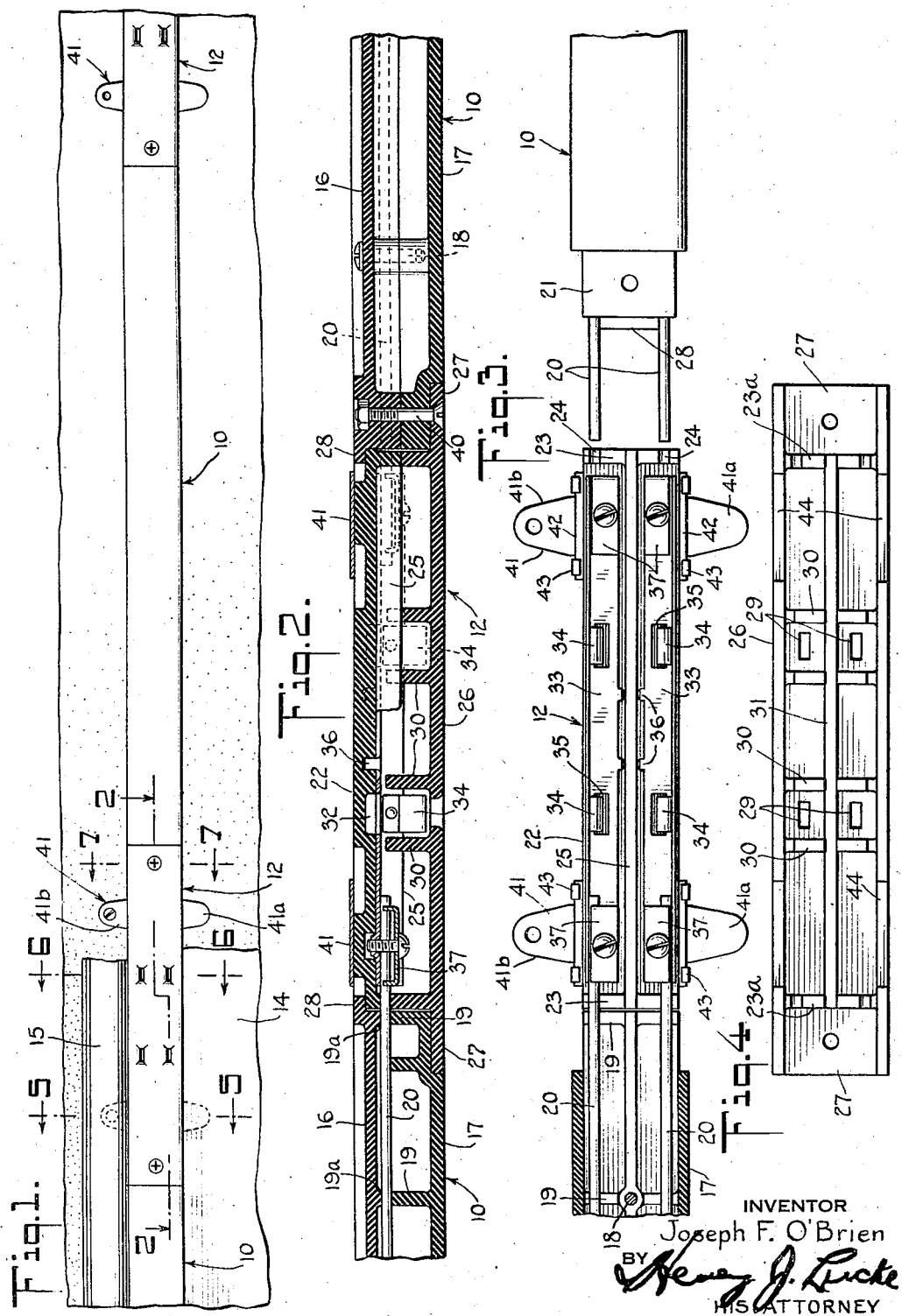
INVENTOR
Joseph F. O'Brien
BY
HIS ATTORNEY April 10, 1945.　　　J. F. O'BRIEN　　　2,373,331
ELECTRICITY CONDUCTOR UNIT
Filed July 25, 1941　　　2 Sheets-Sheet 2
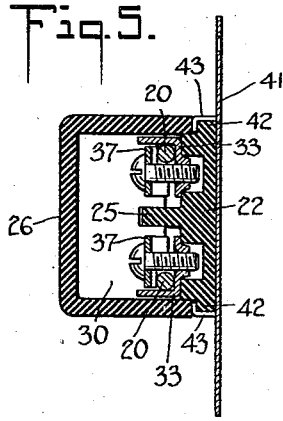
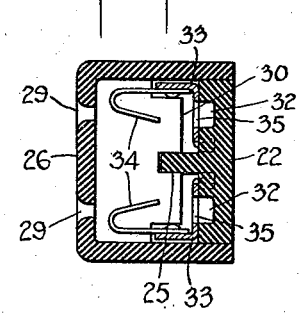
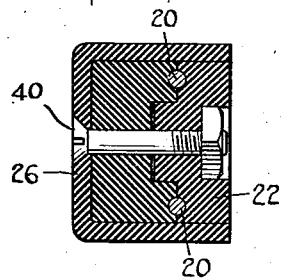
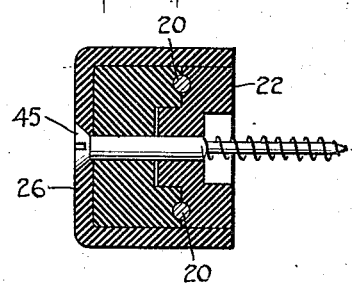
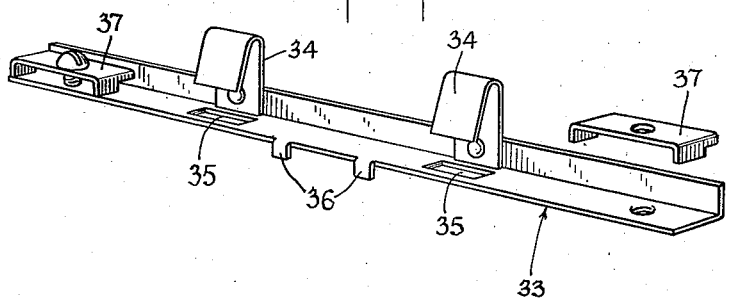
INVENTOR
Joseph F. O'Brien
HIS ATTORNEY Patented Apr. 10, 1945

2,373,331

UNITED STATES PATENT OFFICE 2,373,331

ELECTRICITY CONDUCTOR UNIT

Joseph F. O'Brien, Jersey City, N. J., assignor to John B. Pierce Foundation, New York, N. Y., a corporation of New York Application July 25, 1941, Serial No. 403,978

3 Claims. (Cl. 173—334.1)

This invention relates to electric wiring systems, and particularly to wiring systems embodying seriatim interconnected units adapted for surface installation on a wall or the top of a baseboard or like structural trim.

It is an object of the invention to provide electricity conductor and connector units having improved facilities for the seriatim interconnection thereof.

It is an object of the invention to provide an electric wiring system in which the electrical and mechanical connection of adjacent units may be made from the front of the unit, with means for the complete enclosure of adjacent units over a subtsantial area beyond the point of interconnection thereof.

It is an object of the invention to provide improved clamp means for the electrical interconnection of conductors of adjacent units.

It is an object of the invention to provide an electricity connector unit for interconnecting adjacent conductor units, having improved means for securing the conductors therein against accidental displacement during installation and for maintaining the rigidity thereof during use.

Other features and advantages will hereinafter appear.

In the accompanying drawings—

Fig. 1 is an elevation of a portion of an electric wiring system according to the present invention, run on the baseboard of the wall of a room, said baseboard being shown fragmentarily to reveal the otherwise concealed securement devices;

Fig. 2 is an enlarged section of a portion of the wiring system, looking in the direction of the arrows at 2—2;

Fig. 3 is an enlarged plan view of the portion of the wiring system shown in Figure 2, with the cover member of the left-hand conductor unit removed, and the cover member of the connector unit removed to show the arrangement of the conductors and clamping means therein;

Fig. 4 is a rear view of the cover member of the connector unit of Figure 3;

Fig. 5 is an elevation of the connector unit taken through 5—5 of Fig. 1;

Fig. 6 is an elevation of the connector unit taken through 6—6 of Fig. 1;

Fig. 7 is an elevation of the connector unit taken through 7—7 of Fig. 1;

Fig. 8 is an elevation similar to Fig. 7, but illustrating an alternative method of securement of the wiring system; and Fig. 9 is a perspective of the bus bar and conductor clamp means of the connector unit.

In Figure 1, the portion of a wiring system shown comprises electricity conductor units 10, 10, with alternately positioned connector units 12, 12. The wiring system is illustratively positioned on the top of a baseboard 14, and may be capped by a conventional molding strip 15. Said molding strip and baseboard are fragmentarily shown.

The conductor unit 10 may have a base 16 and a removable cover 17 secured thereto by machine screws or equivalent 18, see Fig. 3. Cover and base may be molded from electrical insulation material to have any suitable plurality of registering transverse walls 19, 19a each being grooved to confine and insulatedly support a suitable plurality of electricity conductors 20, 20. It will be noted that the mating walls at each end of each conductor unit 10 define a completely closed end wall, and that each end, 21, of each conductor unit 10 is of reduced dimension to provide a three-sided stepped extension of substantial length, over which an extending end of the cover of the connector unit fits snugly for complete enclosure of such end portion.

The conductors 20 may be tubes or rods of conductive material; manufacturing economies are effected by employing solid conductors, i. e., rods, or lengths of relatively rigid wire. As clearly appears from Figures 2 and 3, said conductors 20 extend a suitable distance beyond the ends of the units 10.

The connector unit 12 includes a base 22 of insulation material, having a width equal to the width of the projecting ends 21 of the units 10, and a thickness which desirably positions the inner surface of such base in the same plane as an inner surface of the base 16 of the unit 10. The base 22 has at each of its ends a transverse wall 23, desirably having grooves 24, 24 to receive the conductors 20, and a central longitudinal wall 25 coextensive with the base. The removable cap 26 of the unit 12, also of insulation material, has end portions or eaves 27, 27 which are adapted to envelop the ends 21 of the conductor units 10 about three sides thereof, as previously stated. To complete the enclosure of the conductors at the junctures of units 10 and 12, the base member of unit 10 may have a projecting toe 28, to extend into a suitable pocket formed in the base 22 of the unit 12.

The unit 12 is illustrated as having outlet provisions, pursuant to which the cap member has paired apertures 29, 29, desirably bounded by transverse walls 30, 30 and a central wall 31. It will be noted from Figs. 2 and 5 that the transverse walls 30 project beneath the surface of wall 25 and engage the sides thereof, thereby keying the cover 26 positively to the base 22. Disposed beneath said apertures when the housing and base of the connector 12 are arranged in ultimate position, said base has pockets 32 to accommodate the ends of the blades of an electric attachment plug.

Referring to Fig. 9, the conductor 33 of the unit 12 is desirably an angle-shaped stamping of copper or brass, on the vertical wall of which may be riveted or welded contact clips 34, 34 when the connector unit is provided with electric attachment facilities. Immediately beneath such contacts 34 are openings 35, 35 of suitable width to permit the passage of the blades of an electrical attachment plug therethrough and into the pockets 32 in the base 22. Desirably intermediate the contacts 34, the base of the conductor 33 may have a plurality, illustratively two, of downwardly extending lugs 36; said lugs extend into and fit snugly within holes provided in the base 22, to frictionally secure the conductors 33 on the base member 22 and prevent displacement thereof during installation in a vertical plane.

The grooves 24 in the transverse walls 23 of base 22 and the similar grooves in end walls 23a of cap 26 register with the intersection of the vertical and horizontal walls of the angle-form conductors 33; the base grooves guide the conductors 20 of an adjacent unit into preferred position for securement to the conductors 33.

At each end of the conductors 33 there is provided a clamp member 37, desirably of elongate U-shape, stamped from relatively heavy metal. The length of the clamp 37 is suitably less than the extent of projection of a conductor 20 into the unit 12, and the end walls of such clamp adjacent the intersection of the walls of conductor 33 are notched or otherwise angularly cut away to engage the conductor 20 and crowd it into engagement with the conductor 33 at the vertex, i. e., the intersection of the walls, thereof. As shown in Fig. 5, a three-point contact is made, including the contact of the clamp 37 with the conductor 20. A machine screw or equivalent may be employed as the clamping agent, and as Fig. 5 shows, the depth of the end walls and the notches therein affords considerable latitude as to the thickness or diameter of the conductors 20. The downwardly extending end walls have the additional attribute of keeping the flat central portion of clamp 37 suitably above the base of conductor 33 to facilitate the positioning of the conductor 20 beneath the clamp 37.

The wide spacing between the end walls of the clamp and the position of the machine screw centrally therebetween insures adequate electrical connection between the conductors 20 and 33, as well as enhancing the strength of the joint.

Optional means are provided for the mechanical interconnection of adjacent units and for the securement of a run of units to the wall of a room. According to the embodiment of Figures 1 through 3, mechanical interconnection of adjacent units, additional to the connection afforded by the clamping means, is effected by a machine screw and nut 40, which pass through registering openings in the eave 27 of the cap 26 and the extension 21 of a unit 10. The nut of such fastening means is preferably housed within a polygonal pocket in the base member 16 of the unit 10, desirably with a jam fit in such pocket to prevent accidental displacement. The machine screw may, therefore, be inserted and made fast wholly from the front of the unit.

Securement of the run of units to the wall of the room may be accomplished by the mounting clips 41, one or both of the wings of which may be perforated for the passage of a wood screw or like fastening device. Suitably rigid support, however, may be had by inserting the lowermost wing 41a intermediate the baseboard and the wall as shown in Figure 1, and by securing the upper wing 41b to the studding or wall structure by a wood screw. The molding strip 15 fully conceals such upper wing 41b and its screw fastening.

Referring to Figures 3 and 5, it will be noted that the base 22 of connector unit 12 is formed with extending lugs 42, over which fingers 43 of the clips 41 fit in gripping relation therewith. As Figure 5 shows, the extent of outward projection of the lugs 42, plus the thickness of the fingers 43, equals the width of the cap member 26, whereupon the unit with its assembled clips 41 is without break or offset which would interfere with the positioning of the unit on the baseboard, or the fit of the molding strip 15 thereon.

It will also be noted from Figure 5 that the vertical thickness of the lugs 42 is less than the thickness of the base portion, so that a substantial overlap is provided between the side walls of the cap and the upper and lower edges of the base portion. Preferably said cap telescopes over the base portion with a snug fit, thereby minimizing possibility of ingress of dirt or inflow of water into the unit in the areas occupied by the clips 41. It will be understood, see Fig. 4, that the cap member 26 has suitable recesses 44 to accommodate the fingers 43 of the clips.

Where it may not be desirable to employ the clips 41, as where the run of units is exposed on a wall, a wood screw 45 may be substituted for the bolt and nut organization 40, see Fig. 8.

The mechanical joint between the conductors 33 of the unit 12 and the conductors 20 of unit 10 is of great strength. The inherent rigidity of the angle-form conductor 33, and the length of engagement of the clamping means 37 and the two-point contact thereof with a conductor 20, in which such conductor 20 is crowded against the vertex of conductor 33, eliminates possibility of bending, and any outward pull on the conductors 33, as in the circumstance wherein an unusually tight fitting attachment plug is being withdrawn from contact with the clips 34, subjects the conductors 20 to shearing stresses at the end walls of the unit. The relatively snug fit of such conductors 20 with the end wall apertures through which they pass prevents outward displacement of the conductors 20 or 33 during such withdrawal operation. The conductors 33 are additionally firmly secured to the base 22 of the unit 12 by the lugs 36; and it will be noticed that the conductors 33 are thereby secured at each side of the pairs of contact clips 34, and at opposite edges of the base portion of the conductors 33. This four-point attachment and staggering of the points of securement enhance the rigidity of the conductor structure 33.

In assembling the units on the job, the base 22 of the connector unit 12 may first be positioned, whereupon a unit 10 may be placed in adjacency thereto, with the extending ends of the conductors 20 thereof guided into position beneath the clamps 37 by the grooves 24 and the notches in said clamp. The clamp screws may then be tightened up and after a second run unit 10 has been similarly placed in position, the cover member of the connector unit 12 may be fitted over the assembly and made secure by the screw and nut organization 40 at each end thereof.

It is seen, therefore, that the installation of this wiring system is exceedingly simple, in that all operations of connection, etc., are made from the front and in full view of the installer. The clamping means 37, engaging the conductors 20 at two relatively widely spaced points, and urging said conductors into contact with the conductors 33 at the juncture of the angle-forming walls thereof insure proper electrical interconnection of the respective units.

Whereas I have described my invention by reference to specific forms thereof, it will be understood that many changes and modifications may be made without departing from the spirit of the invention.

I claim:

1. A unit of an electric wiring system, comprising a base member, a transverse wall disposed at an end thereof, said wall having a notch, an electricity conductor positioned on said base, said conductor being of rigid angular formation of which one element rests upon said base and the other element extends upwardly therefrom, spring contact means secured to said conductor on the vertical element thereof, and clamping means of elongate inverted U-shape being adjustably secured to said electricity conductor at the end-portion thereof, end walls of said clamping means being notched to define in cooperation with the angular elements of said conductor, an aperture, the area of which is a function of the position of the clamping means relative to the conductor, said notch in the end wall of the base member being substantially in registry with the aperture defined by the conductor and the clamping means, and cover means for said base, said cover having an aperture in registry with the contact means.

2. In a unit of an electric wiring system embodying a series of units electrically connected one with the other, at least one of said units having spaced, electricity conductors extending from an end thereof, connector means for the electrical connection and securement to said unit, the said extending conductors of an adjacent unit; each said connector means comprising a member having at one end, rigid, electrically conductive walls meeting in angular relationship, and clamping means for cooperation with said member at the angle-formed end thereof, said clamping means comprising a rigid, flat, body structure having downwardly depending end walls, said end walls being angularly cut away at their lowermost corner adjacent the intersection of the walls of said angle-formed member to define with said last-named walls, an aperture through which one of the said extending conductors may pass; the said end walls, in the absence of such electricity conductor, supporting the said flat body structure above one of the walls of said angle-formed member to facilitate the insertion of such electricity conductor therebeneath; and means for adjustably securing said clamping means to said member.

3. Connector means for an electric wiring device, comprising the combination with a structure having intersecting walls, at least one of which is electrically conductive, of a clamping member having a flat, rigid body portion disposed in parallelism with one of the walls of said conductor and a substantially vertical end wall of which a side and bottom edge are substantially parallel to the respective intersecting walls, said vertical end wall normally resting upon one of said intersecting walls to support the body portion in spaced relationship thereto; and binding screw means for moving said clamping member toward said angle-form structure to decrease the size of the said aperture and thereby clamp such inserted conductor into tight contact with the clamping member and the said angle-formed walls.

JOSEPH F. O'BRIEN.